US009694629B1

(12) United States Patent
Dry (10) Patent No.: US 9,694,629 B1
(45) Date of Patent: Jul. 4, 2017

(54) SELF-REPAIRING INFLATABLE ARTICLES INCORPORATING AN INTEGRATED SELF-REPAIR SYSTEM (71) Applicant: Carolyn M. Dry, Winona, MN (US)

(72) Inventor: Carolyn M. Dry, Winona, MN (US)

(73) Assignee: Carolyn Dry, Winona, MN (US)

( * ) Notice: Subject to any disclaimer, the term of this patent is extended or adjusted under 35 U.S.C. 154(b) by 705 days.

(21) Appl. No.: 14/152,740

(22) Filed: Jan. 10, 2014

Related U.S. Application Data (63) Continuation-in-part of application No. 13/781,251, filed on Feb. 28, 2013, now Pat. No. 8,685,513.

(60) Provisional application No. 61/634,483, filed on Feb. 29, 2012.

(51) Int. Cl.
B60C 19/12 (2006.01)
B32B 33/00 (2006.01)
E04H 15/20 (2006.01)

(52) U.S. Cl.
CPC .............. B60C 19/12 (2013.01); B32B 33/00 (2013.01); E04H 15/20 (2013.01)

(58) Field of Classification Search
CPC ....... B60C 19/12; B60C 19/122; B60C 73/16; B60C 19/125; B60C 19/127
USPC .......................... 152/503–507; 428/912, 35.8
See application file for complete search history.

(56) References Cited

U.S. PATENT DOCUMENTS

| 1,959,460 A | 5/1934 | Crossan |
| 1,977,281 A | 10/1934 | Knowlton |
| 2,782,829 A | 2/1957 | Peterson et al. |
| 2,877,819 A | 3/1959 | Gibbs |
| 3,048,509 A | 8/1962 | Sweet et al. |
| 3,297,667 A | 1/1967 | Von Dohlen et al. |
| 3,444,918 A | 5/1969 | Goggins |
| 3,541,063 A | 11/1970 | Throckmorton et al. |
| 3,794,604 A | 2/1974 | Throckmorton et al. |
| 3,910,334 A | 10/1975 | Gardner |
| 3,930,526 A | 1/1976 | Edwards |
| 3,935,893 A | 2/1976 | Stang et al. |
| 4,057,090 A | 11/1977 | Hoshikawa et al. |
| 4,095,638 A | 6/1978 | Thompson et al. |
| 4,101,494 A | 7/1978 | Kent et al. |

(Continued)

FOREIGN PATENT DOCUMENTS

| WO | WO-93/16890 | 9/1993 |
| WO | WO-95/09034 | 4/1995 |

OTHER PUBLICATIONS

Berg, T., "Goodyear DuraSeal Tires Heal Themselves," Feb. 28, 2005, Construction Equipment Website: http://www.constructionequipment.com/goodyear-duraseal-tires-heal-themselves, 2 pages.

(Continued)

Primary Examiner — Ellen S Wood
(74) Attorney, Agent, or Firm — Foley & Lardner LLP; Joseph P. Meara (57) ABSTRACT The present disclosure describes a self-repairing article comprising an inflatable component comprising one or more material layers wherein at least one material layer comprises an elastomer. It also describes a self-repairing article comprising a sealed flexible package disposed within or between material layers of the inflatable component, and a repair composition disposed in the sealed flexible package, wherein the sealed flexible package comprises a metal foil and is configured to release the repair composition upon puncture of the inflatable component.

30 Claims, 3 Drawing Sheets (56) References Cited

U.S. PATENT DOCUMENTS

| | | |
|---|---|---|
| 4,149,579 A | 4/1979 | Senger |
| 4,171,237 A | 10/1979 | Bohm et al. |
| 4,262,624 A | 4/1981 | Soeda et al. |
| 4,286,643 A | 9/1981 | Chemizard et al. |
| 4,388,261 A | 6/1983 | Codispoti et al. |
| 4,445,562 A | 5/1984 | Bohm et al. |
| 4,919,183 A | 4/1990 | Dobson |
| 4,978,563 A | 12/1990 | Sandels |
| 5,238,893 A | 8/1993 | Hergenrother et al. |
| 5,274,106 A | 12/1993 | Lawson et al. |
| 5,329,005 A | 7/1994 | Lawson et al. |
| 5,332,810 A | 7/1994 | Lawson et al. |
| 5,393,721 A | 2/1995 | Kitamura et al. |
| 5,491,230 A | 2/1996 | Lawson et al. |
| 5,496,940 A | 3/1996 | Lawson et al. |
| 5,521,309 A | 5/1996 | Antkowiak et al. |
| 5,523,364 A | 6/1996 | Engel et al. |
| 5,527,753 A | 6/1996 | Engel et al. |
| 5,530,037 A | 6/1996 | McDonnell et al. |
| 5,550,203 A | 8/1996 | Engel et al. |
| 5,556,488 A | 9/1996 | Gergele et al. |
| 5,561,173 A | 10/1996 | Dry |
| 5,574,109 A | 11/1996 | Lawson et al. |
| 5,575,841 A | 11/1996 | Dry |
| 5,578,542 A | 11/1996 | Lawson et al. |
| 5,735,083 A | 4/1998 | Brown et al. |
| 5,925,713 A | 7/1999 | Labauze |
| 5,957,494 A | 9/1999 | Yahiaoui |
| 6,013,718 A | 1/2000 | Cabioch et al. |
| 6,182,398 B1 | 2/2001 | Head |
| 6,211,278 B1 | 4/2001 | Vanel |
| 6,261,360 B1 | 7/2001 | Dry |
| 6,362,253 B1 | 3/2002 | Durel |
| 6,527,849 B2 | 3/2003 | Dry |
| 6,539,994 B1 | 4/2003 | Ruffa |
| 6,642,337 B1 | 11/2003 | Misiak et al. |
| 6,915,826 B2 | 7/2005 | Poling et al. |
| 7,022,179 B1 | 4/2006 | Dry |
| 7,037,395 B2 | 5/2006 | Saito |
| 7,044,166 B1 | 5/2006 | Monk et al. |
| 7,569,625 B2 | 8/2009 | Keller et al. |
| 7,588,064 B2 | 9/2009 | Saito |
| 7,607,466 B2 | 10/2009 | Kim et al. |
| 7,811,666 B2 | 10/2010 | Dry |
| 8,221,573 B2 | 7/2012 | Lammlein, Jr. |
| 2001/0050032 A1 | 12/2001 | Dry |
| 2002/0121325 A1 | 9/2002 | Albrecht |
| 2004/0007784 A1 | 1/2004 | Skipor et al. |
| 2004/0055686 A1 | 3/2004 | Cowger et al. |
| 2004/0092648 A1 | 5/2004 | Jones et al. |
| 2005/0027078 A1 | 2/2005 | Scheifers et al. |
| 2005/0250878 A1 | 11/2005 | Moore et al. |
| 2006/0169180 A1 | 8/2006 | Dry |
| 2006/0252852 A1 | 11/2006 | Braun et al. |
| 2007/0087198 A1 | 4/2007 | Dry |
| 2007/0225405 A1 | 9/2007 | Cegelski et al. |
| 2007/0282059 A1 | 12/2007 | Keller et al. |
| 2008/0021149 A1 | 1/2008 | Jones et al. |
| 2008/0173382 A1 | 7/2008 | Gobinath et al. |
| 2008/0264549 A1 | 10/2008 | Shih |
| 2009/0036568 A1 | 2/2009 | Merle et al. |
| 2009/0078352 A1 | 3/2009 | Majumdar et al. |
| 2009/0191402 A1 | 7/2009 | Beiermann et al. |
| 2011/0318562 A1 | 12/2011 | Dry |
| 2012/0118464 A1 | 5/2012 | Ruegg, Jr. |

OTHER PUBLICATIONS

Dhoot, S.N., et al., "Barrier Polymers," Encyclopedia of Polymer Science and Technology, 2002, pp. 248.

Non-final Office Action received for U.S. Appl. No. 13/781,251 dated Sep. 5, 2013.

OTR Wheel Engineering "Polyurethane fill solutions from the largest tire foam filler in North America," Tire Flat-Proofing Solutions Brochure, 2010, 4 pages.

US Notice of Allowance received for U.S. Appl. No. 13/781,251 dated Jan. 29, 2014.

SELF-REPAIRING INFLATABLE ARTICLES INCORPORATING AN INTEGRATED SELF-REPAIR SYSTEM

CROSS-REFERENCE TO RELATED APPLICATIONS

This application is a continuation-in-part of U.S. application Ser. No. 13/781,251, filed Feb. 28, 2013, and entitled "Self-Repairing Inflatable Articles," which claims the benefit of priority to U.S. Provisional Application No. 61/634,483, filed Feb. 29, 2012, the entire contents of which are incorporated by reference herein and for all purposes.

SUMMARY

The present technology provides self-repairing inflatable articles such as tires, inflatable rafts and boats, air beams, sports balls, and the like. An inflatable article of the present technology contains an integrated self-repair system and includes an inflatable component that is made of one or more material layers wherein at least one material layer comprises an elastomer; a sealed flexible package disposed within or between layers of the inflatable component, and a repair composition disposed in the sealed flexible package. The sealed flexible package includes a metal foil. The inflatable articles are configured to release the repair composition upon puncture of the inflatable component. The repair seal formed from the repair composition in the inflatable article is sufficiently air impermeable to allow the article to be used for its intended purpose. In certain embodiments, the repair composition not only seals or plugs the puncture hole(s), but reacts and/or bonds with the surrounding material to form a repair seal that is physically integrated with the article rather than being a distinct plug or patch that is simply adhered to the puncture.

In some embodiments, the sealed flexible package includes two or more sealed cells, the flexible package being adapted for used with an inflatable article. In such embodiments, each cell of the sealed flexible package includes a first sheet with one or more edges; a second sheet with one or more edges; a repair composition disposed between the first and second sheets; and the first and second sheets sealed to each other at the one or more edges, wherein each sheet comprises a polymer and optionally a metal foil or coating.

The foregoing summary is illustrative only and is not intended to be in any way limiting. In addition to the illustrative aspects, embodiments, and features described above, further aspects, embodiments, and features will become apparent by the detailed description.

DETAILED DESCRIPTION OF THE INVENTION

The present technology provides self-repairing inflatable articles that can self-repair after being punctured while inflated. "Puncture" as used herein refers to any breach in the inflated article that allows for loss of gas (e.g., air, nitrogen, carbon dioxide, helium, oxygen, inert gases, e.g., argon) from the article, including but not limited to formation of holes by sharp objects, rips, tears, slices etc. In one aspect of the technology, the articles include an inflatable component that includes one or more material layers wherein at least one material layer includes an elastomer. A sealed flexible package is disposed within or between layers of the inflatable component, and a repair composition is disposed in the sealed flexible package. The sealed flexible package is configured to release the repair composition upon puncture of the inflatable component.

The inflatable component of the self-repairing article can be in any type of tube, ring, torus, open ring, balloon, bladder, or plenum. Each of these components may have any shape known in the art, e.g., linear, circular, oval, semi-circular, spherical, ovoid, toroidal, arch or arch-like. Thus, the inflatable article may have a variety of forms and configurations including, e.g., tires (e.g., pneumatic tires, run flat tires, and tires for motorcycles, cars, trucks, trailers and other vehicles), inner tubes (e.g., for bike tires or other specialized vehicle tires), tire liners, sports balls, balloons (special occasion balloons, weather balloons, hot air balloons, and the like), air mattresses, inflatable rafts and boats, inflatable movie screens, inflatable toys, e.g., inflatable slides, trampolines and other amusement rides, airships, and other inflated articles (e.g., air beams, domes, air frames, and inflatable arches). The inflatable components may be used to support a structure in part or in full, such as a tent or other temporary shelter, or even a building. As such, the inflatable components are commercially available or may be manufactured using known processes, e.g., U.S. Pat. No. 4,095,638 (inner tubes), U.S. Pat. Nos. 6,182,398 and 5,735,083 (air beams), bladders for sports balls (WO 95/09034) and the like.

The inflatable component of self-repairing inflatable articles may be made of one or more layers of a wide variety of materials known in the art for such articles, including polymers such s elastomers. Elastomers known in the art, including, natural and synthetic rubbers, in the form of films, membranes, layers, and laminates, and optionally including any of woven and unwoven fibers, cables, cords, fillers and additives (e.g., carbon black, silica and the like). Suitable elastomers for the inflatable component include, e.g., vulcanized rubbers and other thermoset elastomers, thermoplastic elastomers and combinations thereof. Examples of useful polymers include rubber (e.g., natural rubber, styrene-butadiene rubber, polybutadiene rubber, styrene-isoprene rubber, styrene-isoprene-butadiene rubber, polyvinylalcohol, acrylonitrile-butadiene rubber, polychloroprene (also known as neoprene), polyisoprene (e.g., cis-1,4-polyisoprene), nitrile rubber, butyl rubber, halogenated butyl rubber, polysulfide rubber, and ethylene propylene diene rubber (i.e., EPDM rubber), amorphous 1,2-polybutadiene, ethylene-propylene terpolymers, styrene-butadiene-styrene block copolymer, hydrogenated styrene-butadiene-styrene block copolymer (i.e., styrene-ethylene-butene-styrene block copolymer), hydrogenated styrene-butadiene block copolymer, styrene-isoprene-styrene block copolymer, hydrogenated styrene-isoprene-styrene block copolymer (i.e., styrene-ethylene-propylene-styrene block copolymer), silicone rubber, polyurethane rubber, epichlorohydrin rubber, and combinations thereof. In addition, the inflatable component may include other polymers such as, e.g., nylons, polyamides, polyethylenes, and polyesters.

The present technology provides sealed flexible packages containing a repair composition for use in self-repairing inflatable articles. The inflatable articles may include more than one sealed flexible package and may include a plurality of such packages. The sealed flexible packages are configured for use in inflatable articles of the present technology. Thus, the sealed flexible package may be molded into a material layer or inserted between material layers. In any case the packages are configured so that when the inflatable component is punctured, the sealed flexible package will also be punctured or broken so that the repair composition inside is released into the damaged area of the inflatable component. As configured within the inflatable article (e.g., a tire), the sealed packages remain flexible rather than stiff, in contrast to certain sealant tubes known in the art. In some embodiments, the flexible packages make up a single layer of the inflatable components, whereas in other layers they make up two, three, four or more layers of the inflatable component. Thus, the sealed flexible packages may be arranged in a layer conforming to the shape of the inflatable component or in at least two (or more) layers conforming to the shape of the inflatable component. Such layers may be separated by one or more layers of other materials, e.g., carcass plies in a pneumatic tire. In some embodiments having more than one layer of the sealed flexible packages, the flexible packages of each layer are staggered in relation to each other and may at least partially overlap. Alternatively, the layers of flexible packages may be completely overlapping.

The sealed flexible package may be configured with one cell per package or may include two or more sealed cells in which the repair composition is disposed. The cells may be any suitable shape such as circular, oval, rectilinear, square, rectangular, pentagonal, hexagonal, or octagonal. Where the flexible packages include a plurality of sealed cells, they may be aligned in any pattern that permits them to release the repair composition upon puncture of the inflatable component and the flexible package. In some embodiments, the inflatable article is a pneumatic tire and the plurality of sealed cells advantageously prevents the pooling of the repair composition and thus prevents the tire from becoming unbalanced. The use of multiple sealed cells also prevents excess repair composition from being released upon puncture, because only the punctured cells of the flexible package will release repair composition. Unpunctured sealed cells retain the repair composition for use should other punctures occur. In some embodiments, at least some of the sealed cells are aligned with each other in a first direction. For example, the flexible sealed package can be a tape with multiple sealed cells arrayed in a linear fashion along its length (such as, but not limited to rectangular cells positioned end to end). The tape optionally includes perforations to allow the tape to be readily adjusted in length by, e.g., tearing at the perforations. In others, at least some of the sealed cells are aligned with each other in a first direction and in a second direction, different from the first direction. In some embodiments, at least some of the sealed cells are positioned in an offset relationship to one another in a first direction.

The sealed flexible package used in the present technology may include a first sheet with one or more edges; a second sheet with one or more edges; and the repair composition disposed between the first and second sheets. The first and second sheets are typically sealed to each other at the one or more edges, and each sheet includes a polymer (e.g., a polymer film). Alternatively, the sealed flexible package is formed from a single sheet folded over on itself and sealed where the edges meet. In some embodiments, at least one sheet of the sealed flexible package further comprises a metal (e.g., a foil or metal coating). Thus, in some embodiments, each sheet may be a laminate comprising two or more layers. For example, each sheet may be laminate that includes a polymer layer and a metal foil layer or a metalized polymer layer with a repair composition disposed within the package. In some embodiments, the metal layer is aluminum, tin, steel or an alloy of any one of the foregoing. In other embodiments, the laminate comprises a metal foil layer between two or more polymer layers such as two or three polymer layers that are the same or different, e.g., between two layers of polyethylene, between polypropylene and polyethylene or between polyester and polyethylene films. In some embodiments, the sheet is a laminate having a top layer of polyester, an adhering later of polyethylene, a metal foil such as aluminum foil and a second layer of polyethylene which forms the internal surface of the package. The laminate layers may be adhered to each other by heat, adhesive, coextrusion or a combination of such methods. In some embodiments the sealed flexible packages are generally rectangular and are sealed along all four sides. In other embodiments, the sheet is folded over on itself and sealed on three sides. In still others, the sealed flexible packages are tube shaped and may be coextruded, together with the repair composition. Each sheet, whether a laminate or single ply film or membrane may be between about 0.5 mil and about 100 mils in thickness. Examples of sheet thickness include about 0.5, about 1, about 2, about 3, about 4, about 5, about 10, about 15, about 20, about 25, about 30, about 40, about 50, about 60, about 70, about 80, about 90, and about 100 mils, or any range between and including any two of the foregoing values. For example, the sheets may range from about 5 to about 20 mils thickness. Such sheets may be formed using methods known in the art.

The flexible sealed package may also include an elastomeric membrane as its outermost surface or may otherwise be surrounded by an elastomeric membrane. The elastomeric membrane may be a rubber membrane, e.g., natural rubber, butyl rubber, polybutadiene rubber, styrene-butadiene rubber or any others known in the art.

The sealed flexible package may be produced by filling unsealed or partially sealed packages with the repair composition and heat sealing, cold sealing, pressure sealing (e.g., crimping), or a combination of any two or more thereof. Alternatively, the repair composition may be co-extruded with the laminate forming the sealed flexible packages. The flexible packages may be fabricated in a wide variety of sizes to suit the application at hand. For example, the sealed flexible packages (or cells within the packages) may be generally rectangular in shape with dimensions ranging from 0.5 cm×1 cm to 10 cm×30 cm. In some embodiments the sealed flexible packages range from 1 cm×2 cm to 5 cm×10 cm and are suitable for use in bicycle tires. Larger sealed flexible packages suitable for motorcycle, car, truck, bus and tractor tires may range from 5 cm×10 cm to 10 cm×30 cm or more, depending on the size of the tire. Alternatively, the flexible packages may be formed in long tube-shapes with widths ranging from 1 mm, 2 mm, 3 mm, 4, mm, 5 mm, 6 mm, 7 mm, 8 mm, 9 mm, 1 cm, and up.

Polymers that may be used in sealed flexible packages of the present technology include but are not limited to nylon, polyolefin (e.g., polyethylene, polypropylene, polybutene, polyisoprene, ethylene-propylene copolymers, ethylene-octene copolymers, propylene-butene copolymers, propylene-octene copolymers, and combinations thereof), polyester, polycarbonate, polyacrylate, polyarylate, polyamide, polyimide, polyaramide, polyurethane, cellulose (including, e.g., cellulose esters), and nitrocellulose. In some embodiments, the polymer is selected from the group consisting of polyester, polyethylene and polypropylene. Other polymers that may be used in the sealed flexible packages include rubber, ethylene vinyl acetate, polyvinyl acetate, polyvinyl butyral, polyvinyl chloride polyvinyl carbonate, and ethylene vinyl alcohol. Combinations of any two or more of the forgoing may also be used. Preferably, the polymers and/or metal layer(s) are selected such that the flexible is of very low permeability or essentially impermeable to air, moisture, and a combination thereof in order to protect the integrity of the repair composition inside.

An interior surface of the sealed flexible package can be treated to achieve a variety of functions including, e.g., to prevent or decrease reaction of the repair composition before it is released from the package to perform the sealing function, altering (e.g., increasing or decreasing) the surface tension of the surface of the package, altering (e.g., increasing or decreasing) the hydrophobicity or hydrophilicity of a surface of the package, altering (e.g., increasing or decreasing) the reactivity of a surface of the package to prevent premature reaction or crosslinking of the repair composition with a component of the flexible packaging, and combinations thereof. In some embodiments, an interior surface of the sealed flexible package is treated with an acid to provide an acid-treated surface that will prevent or resist reaction with the repair composition. Acids such as muriatic acid, maleic acid, or acetic acid may be used to produce the acid-treated surface.

The repair composition of the present technology is a composition that, when released from the flexible sealed package, flows into the punctured area(s) of the inflatable component, and seals and repairs the inflatable component against further loss of gas (e.g., air, nitrogen, argon, carbon dioxide, helium, etc.) and preferably allows for reinflation of the component if needed. The repair composition may be in the form of a liquid, gel, suspension, or emulsion. In some embodiments, the repair composition not only fills the damaged area of the inflatable component, but reacts with the material of the inflatable component to more securely anchor the newly formed seal. In certain embodiments, upon release from the sealed flexible package, the repair composition forms a gas barrier seal in less than 10 minutes, in less than five minutes, in less than four, three, two or one minute, in less than 30 seconds, in less than ten seconds, in less than 5 seconds, or even less than 3 seconds. The repair composition can remain active after storage at room temperature for at least 6 months, at least 1 year, at least 2 years, or even at least 5 years.

The repair composition can be formulated to maintain its sealing and repairing properties (i.e., activity) when heated or cooled to the temperatures experienced by, e.g., a tire during use or during the manufacturing process for the self-repairing inflatable article. Thus, in some embodiments, the repair composition will remain active even when heated to at least about 75° C., at least about 100° C., at least about 125° C., at least about 150° C. or even at least about 177° C. or ranges between and including any two of these values. The repair composition preferably remains reactive and able to repair a puncture after exposure to extreme temperature and pressure conditions including, e.g., freezing weather conditions (e.g., from about −40° C. to about 5° C.) and hot weather conditions (e.g., from about 25° C. to about 60° C.) the heat and pressure experienced by a tire during use (e.g., driving (e.g., freeway driving)), desert conditions (e.g., conditions experienced by tires on military vehicles), or during the manufacturing process, e.g., even temperatures of at least about 75° C. (167° F.), at least about 80° C. (176° F.), at least about 88° C. (about 190° F.), at least about 120° C. or even about 177° C. (i.e., 350° F.), and ranges between and including any two of these values.

A variety of known compounds and materials may be used in repair compositions of the present technology. The repair compositions may include polymerizable components (e.g., monomers, oligomers, and polymers), crosslinkable components, and combinations thereof. Useful repair compositions include compositions that cure upon exposure to air, atmospheric moisture, and combinations thereof, and two-part repair composition in which one part cures upon exposure to the other part and ones in which the one component softens in reaction with the other and so fills and plugs the hole and reacts with the rubber of the elastomer. The repair composition may include a chemical capable of chemically bonding to an elastomeric polymer such as rubber, e.g., natural and/or synthetic rubber. In some embodiments, the repair composition may include one or more of cyanoacrylate, one-part epoxy, polymerizable monomers, polyurethane, rubber cement, rubber latex, and cold vulcanizing fluid or cold vulcanizing fluid with rubber whiskers (e.g., natural rubber whiskers). In other embodiments, the repair composition includes one or more of an acrylate, alkyl acrylate (e.g., methyl acrylate), alkyl methacrylate (e.g., methyl methacrylate), cyanoacrylate, acrylic acid, alkyl acrylic acid, olefin, lactone, lactam, styrene, isoprene, butadiene, urethane, dicyclopentadiene and epoxy. In certain embodiments, the repair composition may include one or more of ethyl 2-cyanoacrylate, methyl 2-cyanoacrylate, n-butyl cyanoacrylate, 2-octyl cyanoacrylate, alkyl (meth)acrylate, rubber cement, cold vulcanizing fluid, and a mixture of cold vulcanizing fluid and rubber pieces, e.g., rubber whiskers, including natural rubber whiskers. In some embodiments, the repair compositions include one or more silanes, siloxanes, acrylates (e.g., alkyl acrylates and alkyl (methacrylates)), cyanate esters, acrylic acids (e.g., alkyl acrylic acids), epoxies (e.g., epoxy vinyl ester, one part and two part epoxies), ethylenically unsaturated esters, polysiloxanes, olefins, lactones (e.g., caprolactone), lactams, styrenes, isoprene and butadiene, and compositions that include at least one of sulfur, peroxides, urethane crosslinkers, metal oxides, and acetoxysilanes, rubber cement, cold vulcanizing fluids, cyanoacrylates (e.g., methyl-2-cyanoacrylate, ethyl-2-cyanoacrylate, n-butyl cyanoacrylate, 2-octyl cyanoacrylate, bis-2-cyanoacrylate, cyanoacrylates with silicon, fluoroalkyl-2-cyanoacrylate, aryloxy ethyl-2-cyanoacrylate, cyanoacrylates with unsaturated groups, trimethylsilyl alkyl-2-cyanoacrylate, stabilized cyanoacrylate adhesives, and stabilized cyanoacrylate adhesives disclosed in U.S. Pat. No. 6,642,337 and U.S. Pat. No. 5,530,037 and incorporated herein, and combinations thereof), silanes, siloxanes, acrylates (e.g., alkyl acrylates and alkyl(methacrylates)), cyanate esters, acrylic acids (e.g., alkyl acrylic acids), epoxies (e.g., epoxy vinyl ester, one part and two part epoxies), ethylenically unsaturated esters, polysiloxanes, olefins, lactones (e.g., caprolactone), lactams, styrenes, isoprene and butadiene, and compositions that include at least one of sulfur, peroxides, urethane crosslinkers, metal oxides, and acetoxysilanes, and combinations thereof. In one embodiment, the repair composition includes ethyl-2-cyanoacrylate, hydroquinone, and methyl methacrylate.

Epoxies that may be used in repair compositions include, e.g., monofunctional epoxies (e.g., phenyl glycidyl ether, cresyl glycidyl ether, and glycidyl ethers of alcohols (e.g., dodecyl alcohol)), multifunctional epoxies (e.g., epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of polyhydric phenols (e.g., glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis(4-hydroxyphenyl)-propane (i.e., bisphenol A), and bis-(4-hydroxyphenyl)-methane (i.e., bisphenol F, which may contain varying amounts of 2-hydroxyphenyl isomers)), cycloaliphatic epoxy resins, epoxy novolac resins (i.e., glycidyl ethers of novolac resins), and combinations thereof.

Olefins may be used in repair compositions include, e.g., straight chain, branched, and cyclic olefins derived from a variety of olefin monomers and oligomers including, e.g., olefin monomers containing from 2 to 20 carbon atoms (e.g., 2, 3, 4, 5, 6, 7, 8, 9, 10, 12, 14, 16, 18, 20 and ranges between/including any two of the forgoing values) and optionally containing heteroatoms. Examples include cyclic olefins such as dicyclopentadiene (DCPD), substituted DCPDs, DCPD oligomers, DCPD copolymers, norbornene, substituted norbornene, cyclooctadiene, and substituted cyclooctadiene. Useful norbornenes include, e.g., triethoxysilylnorbornene, norbornene, ethyl norbornene, propylnorbornene, butylnorbornene, hexylnorbornene, alkyl-substituted norbornene derivatives, and alkoxysilynorbornenes.

The repair composition optionally includes conjugated diene monomers, and vinyl-substituted aromatic monomers copolymerized with at least one conjugated diene monomers. Examples of useful conjugated diene monomers include 1,3-butadiene, 2,3-dimethyl-1,3-butadiene, 2-phenyl-1,3-butadiene, 2-ethyl-1,3-butadiene, isoprene, 1,3-pentadiene, 2-methyl-1,3-pentadiene, 2,3-dimethyl-1,3-pentadiene, 3-methyl-1,3-pentadiene, 4-methyl-1,3-pentadiene, 1,3-hexadiene, 2,4-hexadiene, and 4,5-diethyl-1,3-octadiene. Examples of useful vinyl-substituted aromatic monomers include styrene, 4-methylstyrene, alpha-methylstyrene, 3,5-diethylstyrene, 4-ethylstyrene, 4-propylstyrene, 3,5-diethylstyrene, 2,4,6-trimethylstyrene, 4-dodecylstyrene, 2,3,4,5-tetraethylstyrene, 3-methyl-5-normal-hexylstyre-ne, 4-phenylstyrene, 2-ethyl-4-benzylstyrene, 3,5-diphenylstyrene, 1-vinylnaphthalene, 3-ethyl-1-vinylnaphthalene, 6-isopropyl-1-vinylnaphth-alene, 6-cyclohexyl-1-vinylnapthalene, 7-dodecyl-2-vinylnaphthalene, and combinations thereof. Other useful monomers include, e.g., cyclic ethers containing a tetrahydrofuran moiety.

For two part systems, the components of the two part system are positioned such that a first part will contact a second part when the article is punctured. The first and second parts can be located in a variety of configurations relative to the elastomeric article including, e.g., a first part contained within the sealed package and a second part present on the elastomeric article (e.g., on the interior surface of the elastomer, on a wheel rim associated with the elastomeric article, on an inner tube, and combinations thereof), a first part contained in a first cell of a sealed package that includes multiple cells and a second part in a second cell of the sealed package, a first part in the sealed package and a second part on the exterior surface of the sealed package, a first part in the sealed package and a second part on the optional additional layer associated with the sealed package, and combinations thereof. The second part can be applied to the elastomeric article using a variety of techniques including, e.g., spraying, coating, brushing, coextruding, and combinations thereof.

In some embodiments, the repair composition may include small pieces or particles of rubber (natural and/or synthetic), other elastomers or asphalt (i.e., bitumen) in the form of, e.g., fibers, whiskers, particles (e.g., powder, granule, microparticles, microspheres, and combinations thereof), filaments, and combinations thereof. The amount of rubber, other elastomers or asphalt can range from 0% to about 75% by weight. Examples of such amounts include 0%, about 2%, about 5%, about 10%, about 15%, about 20%, about 30%, about 40%, about 50%, or about 75% by weight, or a range between and including any two of the foregoing values. In some embodiments, the repair composition may comprise a rubber latex mixed with an adhesive and an anti-freezing agent, such as e.g., described in U.S. Patent Publication No. 20070225405, incorporated herein by reference. In some embodiments, the anti-freezing agent is ethylene glycol, propylene glycol, glycerin, or potassium acetate, or a combination of two or more thereof. In some embodiments, the antifreezing agent is glycerin, potassium acetate, or a combination of both. In certain embodiments, the ratio of the anti-freezing agent to the total weight of the puncture sealing agent composition is between about 5% and about 75% by weight. Examples of suitable weight ratios include about 5%, about 10%, about 15%, about 20%, about 25%, about 30%, about 35%, about 40%, about 45%, about 50%, about 55%, about 60%, about 65%, about 70%, about 75%, and ranges between and including any two of the foregoing values.

The self-repairing inflatable article may further include one or more additives or other materials such as catalysts, initiators, accelerators, solvents, fillers (e.g., fibers and fibrous materials that enhance the sealing capability of the sealing composition), heat-resistant agents, antioxidants, colorants, thickeners, anti-corrosion agents, surfactants, and biocides. The additives or other materials may be part of the repair composition or may be configured to reside elsewhere in the article, e.g., on the surface of one of the other components of the article, such as the interior or exterior of the inflatable component, or the exterior of the sealed flexible package.

The article of the present technology optionally includes a catalyst capable of facilitating the polymerization of the monomer(s) in the repair composition. Certain catalyst systems will effectively facilitate the polymerization of specific monomers, and the catalyst should be selected accordingly. Useful catalyst systems include, e.g., Grubbs ruthenium catalysts, coordination catalyst systems, lanthamide-based catalyst systems that include a lanthamide compound (e.g., a neodymium compound), an alkylating agent, and a source of halogen, examples of which are described in U.S. Pat. Nos. 3,297,667, 3,541,063, and 3,794,604 and incorporated herein. Lanthamide-based catalyst systems are useful for polymerizing conjugated diene monomers including, e.g., 1,3-butadiene monomer into cis-1,4-polybutadiene rubber. Repair compositions that include norbornene, and substituted norbornene monomers optionally include a catalyst, e.g., a ring opening metathesis polymerization (ROMP) catalyst (e.g., a Schrock catalyst), optionally in combination with a Lewis acid, a Bronsted acid, and combinations thereof. Catalysts suitable for use in conjunction with lactones and lactams include, e.g., cyclic ester polymerization catalysts and cyclic amide polymerization catalysts (e.g., scandium triflate). In one embodiment, the repair composition includes dicyclopentadiene, and the catalyst includes a ruthenium-based Grubb's catalyst.

The present article optionally includes, e.g., in the repair composition, an accelerator that decreases the reaction time, i.e., increase the rate of reaction. Examples of suitable accelerators include silicon, styrene and alpha-methylstyrene, and bis-cyanoacrylate, and particles such as clay, nanoclays, montmorillite clay, carbon black, sodium hydroxide (e.g., a 50% solution of sodium hydroxide in water and pellets of sodium hydroxide), gases (e.g., ammonia), and combinations thereof. The accelerator can be present in the self-repairing inflatable article in a variety of configurations including on the exterior surface of the sealed flexible package, on the interior surface of the inflatable component, or on the exterior surface of the inflatable component.

The present articles optionally include an initiator. Useful anionic polymerization initiators include, e.g., organolithium initiators (e.g., butyllithium), functional initiators (e.g., lithium amide initiators, aminoalkyl lithium initiators, and organotin lithium initiators), and combinations thereof. Exemplary initiators are described in U.S. Pat. Nos. 5,153,159, 5,268,439, 5,274,106, 5,238,893, 5,332,810, 5,329,005, 5,578,542, 5,393,721, 5,491,230, 5,521,309, 5,496,940, 5,574,109, 5,523,364, 5,527,753, and 5,550,203 and incorporated herein. These initiators are particularly useful for synthesizing conjugated diene elastomers or copolymers of conjugated diene monomers and vinyl-substituted aromatic monomers.

The repair composition optionally includes an organic solvent. Examples of suitable organic solvents include ethyl ether, acetone, n-heptane, n-hexane, toluene, acetone, glycerol, methyl ethyl ketone, methyl isobutyl ketone, methylene chloride, ethylene dichloride, pyridine, isooctane, chloroform, carbon tetrachloride, o-xylene, water, dimethyl sulfoxide and combinations of any two or more thereof. In some embodiments the repair composition includes a high-boiling solvent (e.g., boils at least about 75° C. such as, but not limited to, toluene, o-xylene, dimethylformamide, dimethyl sulfoxide, pyridine, etc.) or small amounts of low boiling solvents. In some embodiments, the repair composition includes cold vulcanizing fluid, one or two high boiling solvents and optionally whiskers of uncured rubber. Suitable solvents include but are not limited to trichloroethylene, toluene, o-xylene, dimethylformamide, and dimethyl sulfoxide. Preferably the high boiling solvent also has low flammability.

The repair composition optionally includes fillers. Examples of suitable fillers include fibers, rubber (natural and synthetic, vulcanized and unvulcanized), metal carbonates (e.g., calcium carbonate (chalk, calcite, marl, travertine, marble and limestone)), calcium magnesium carbonate, sodium carbonate, magnesium carbonate), silica (e.g., quartz, glass beads, glass bubbles and glass fibers), silicates (e.g., talc, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, wood flour, aluminum trihydrate, carbon black, certain metal oxides (e.g., calcium oxide (lime)), alumina, tin oxide (e.g. stannic oxide), titanium dioxide, metal sulfites (e.g., calcium sulfite), thermoplastic particles (e.g., polycarbonate, polyetherimide, polyester, polyethylene, polysulfone, polystyrene, acrylonitrile-butadiene-styrene block copolymer, polypropylene, acetal polymers, polyurethanes, and nylon particles) and thermosetting particles (e.g., phenolic, phenolic, polyurethane). The particles can be in a variety of forms including granules, beads, bubbles, foam, whiskers and combinations of any two or more thereof.

Other additives may be added to the repair composition or the self-repairing inflatable article in general. Additives that can be added to improve the heat resistance of the repair composition include, e.g., cyclic organic sulfates, sulfites, sulfoxides, sulfinates (e.g., 2-oxo-1,3,2-dioxathiolanes), hydroquinone, and antioxidants (e.g., phenolic antioxidants such as butylated hydroxyanisole (i.e., BHA or tert-butyl-4-hydroxyanisole) and butylated hydroxytoluene (i.e., BHT or 2,6-di-tert-butyl-p-cresol)). Antioxidants that may be employed include those available under the IRGANOX family of trade designations from BASF Chemical Company (Germany). Additives such as these may be present at about 1-10 wt %, i.e. about 2, about 3, about 4, about 5, about 6, about 7, about 8, about 9, or about 10 wt % in the composition, or in ranges between/including any two of the foregoing values.

Other additives could be added to the repair composition to provide additional or alternate characteristics including increasing the shelf life of the repair composition (e.g., sulfur), increasing the plasticity of the composition, changing the color of the repair composition upon reaction, thickeners, anti-corrosion agents, surfactants, and biocides. For example, dyes or color changing indicators could be added to the repair composition. These include food colors, bromocresol purple, bromocresol green, bromothymol blue, sulforhodamine B, and cyanoacrylates that can indicate that it has reacted by a color change.

The repair composition can also include additives that increase the pressure within the sealed package, thereby increasing the rate at which the repair composition is pushed out of the sealed flexible package. Examples of such additives include triacetone triperoxide, butane, and combinations thereof.

Inflatable articles of the present technology include pneumatic tire such as a car tire, truck tire, garbage truck tire, motorcycle tire, trailer tire, military vehicle tire or ATV tire. The tire may be a radial tire. In some embodiments, the tire includes a tire carcass, a sealed flexible package disposed within or adjacent to the tire carcass, wherein a repair composition is disposed in the sealed flexible package, the flexible package including a metal foil and being configured to release the repair composition upon puncture of the flexible package. The tire may further comprise an inner liner, located radially inward of the carcass and/or a tread located radially outward from the carcass. The sealed flexible package may be disposed between the inner liner and the carcass, between the carcass and the tire tread or within the carcass, between carcass plies. Such tires may include any of the flexible sealed packages disclosed herein. The present technology further provides wheels that include any of the tires disclosed herein.

In some embodiments of the present self-repairing tires, the flexible packages are shaped like tubes, having any suitable cross sectional configuration (e.g., circular, rectangular, triangular). The tires include multiple radially adjacent layers of flexible sealed packages, e.g., at least two to five layers of such packages.

In another aspect of the present technology, to assist in incorporating the layer(s) of flexible sealed packages into the tire, the sealed flexible package is encased in an elastomeric membrane having the same composition as the inner liner of the tire. Alternatively, the elastomeric membrane can have the same composition as an elastomer comprising the tire carcass or the tread.

In another aspect, the present technology provides methods for making the self-repairing inflatable articles. The methods include disposing (e.g., laminating) a layer including a sealed flexible package to one or more material layers of the inflatable component, e.g., between two such layers. Where the inflatable article is a tire, the sealed flexible packages in the shape of a tube(s) are helically wound on a tire building drum to form a layer on the innerlayer, on the carcass, or as one of the carcass layers. Additional layers, including, e.g., belts and tread may then be added as desired. The tire is subsequently cured according to standard techniques to laminate all the layers. Alternatively, a sheet of the sealed flexible packages may be applied to the inner liner, carcass or as a layer in the carcass.

Figure 1:
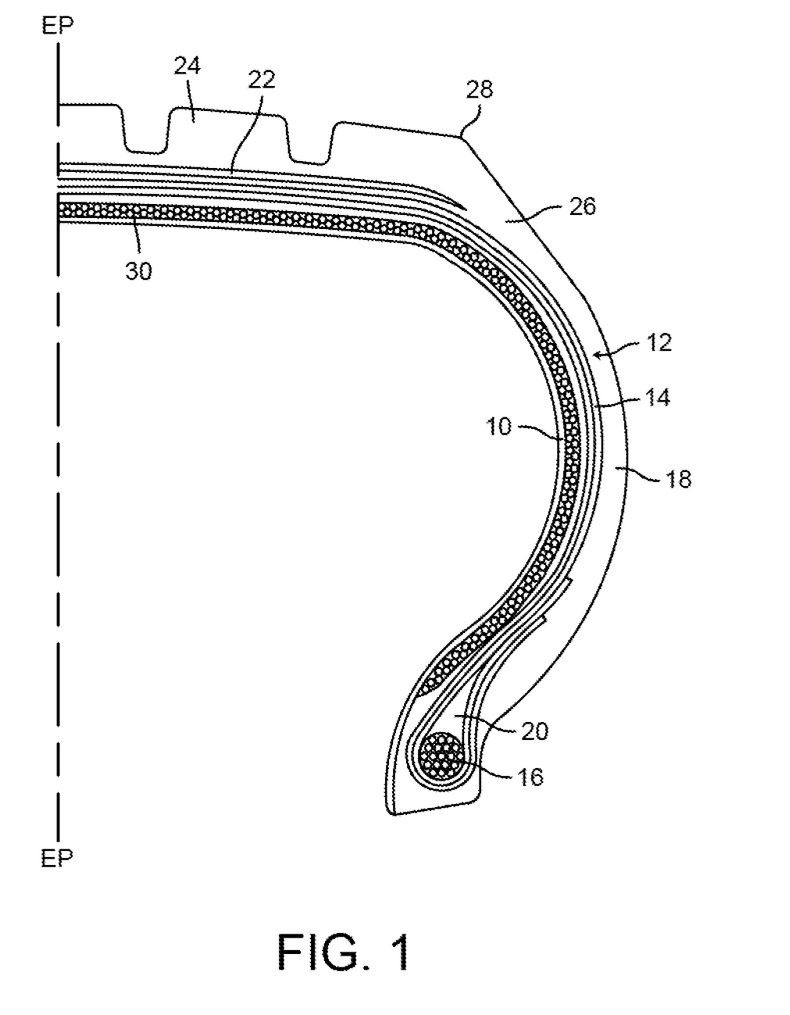
FIG. 1 shows a cross-sectional view of an illustrative embodiment of a tire having a self-repair layer comprising sealed flexible packages.

In an illustrative embodiment of the present technology, FIG. 1 shows cross-section of a pneumatic tire divided along its equatorial plane E; the non-illustrated half of the tire is ideally a mirror image of the illustrated half. The tire has the following construction: an inner liner 10, a carcass layer 12 formed from a number of plies 14, the carcass plies 14 being turned up about a pair of bead cores 16 located at the radially inner end of each sidewall 18, an apex 20 extending radially above each bead core 16 to fill in the space between the main portion of the carcass plies 14 and the turn-up portions of the carcass plies 14, a belt structure 22 radially outward of the carcass layer 12, and a tread 24 radially outward of the belt structure, the tire having a pair of shoulders 26 that extend from the tread edges 28 to the sidewalls 18. The illustrated tire is merely exemplary and one skilled in the art would readily appreciate that the above described elements of the tire will vary depending on the end use of the tire. For example, if the tire were to be used as a radial medium truck tire, the number of carcass plies would be at least three and at least two steel belt plies.

Located radially outward of the inner liner 10 is a self-repair layer 30, containing the sealed flexible packages. The self-repair layer 30 extends at least from an axial location corresponding to the tread edges 28. The self-repair layer 30 preferably extends into the upper regions of the sidewalls 18 and for some tires subject to sidewall punctures during use, the self-repair layer 30 may extend from bead core 16 to bead core 16. The self-repair layer 30 is illustrated as being adjacent to the inner liner 10 and radially inward of the carcass layer 12. However, the self-repair layer 30 may also be placed between adjacent carcass plies 14, between the carcass layer 12 and the belt structure 22, or radially inward of the inner liner 10. Depending upon the number of plies in the belt structure, and the intended use of the tire and its operating characteristics, the self-repair layer 30 may also be placed between plies of the belt structure.

Figure 2:
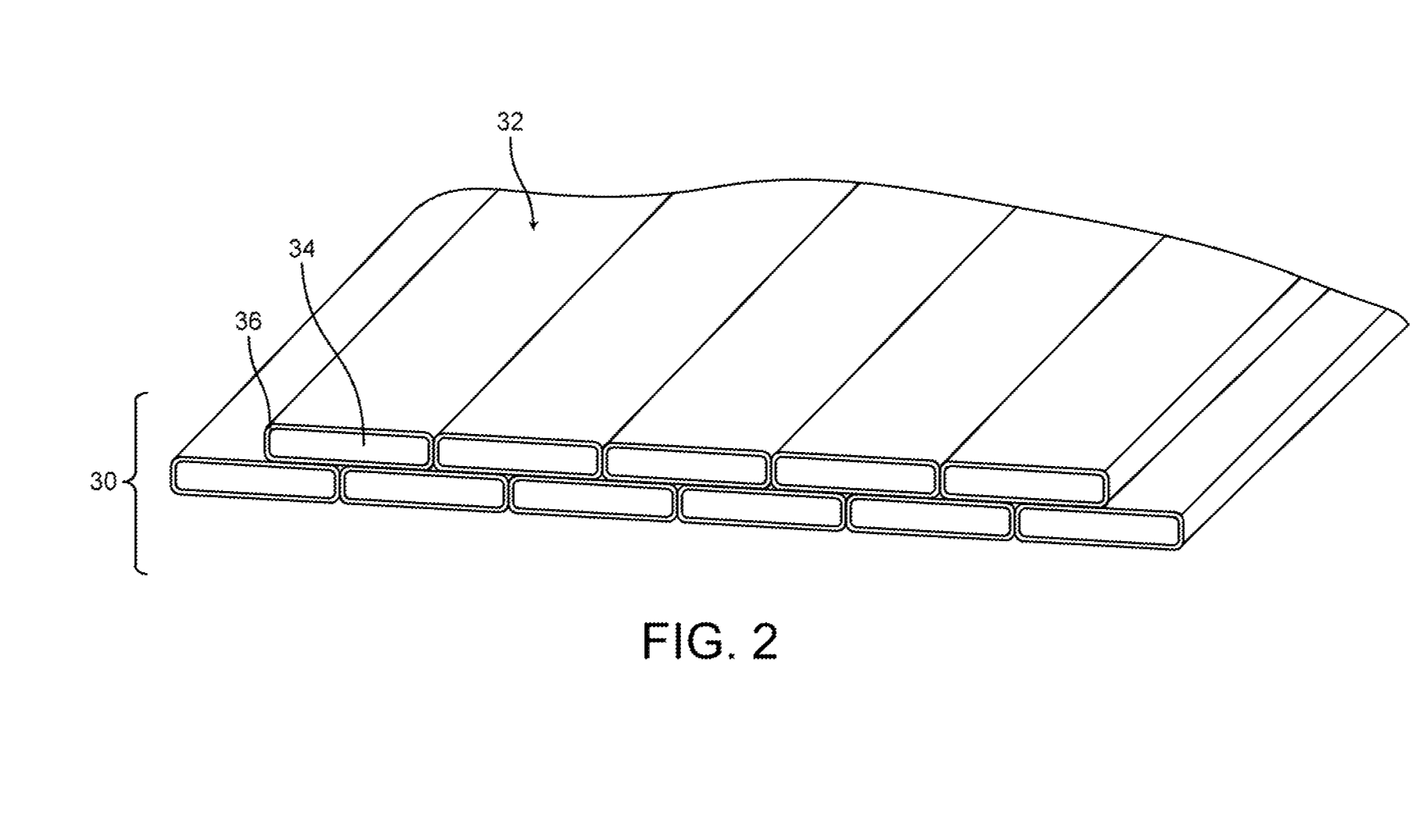
FIG. 2 illustrates one embodiment of the self-repair layer.

The self-repair layer 30 is formed from a plurality of individually formed sealed flexible packages 32, see FIG. 2. Each sealed flexible package 32 is formed by coextruding a repair composition 34 in a tube or fiber made of a laminate comprising a metal foil sandwiched between two polymer films. The tubes are periodically crimped or otherwise sealed to form multiple cells containing the repair composition along the length of the tube. The repair composition 34 is selected based upon the desired properties of the self-repair system and the operating conditions to which the composition 34 may be subjected, as described above.

The self-repair layer 30 has at least two layers of offset sealed flexible packages 32. By forming at least two layers in this manner, every location along the axial width of the tire tread, and the shoulders if the self-repair layer 30 extends into the shoulders, is protected by the self-repair layer. Should an object pass between adjacent tubes 32 in the radially outer layer, the obstruction will pierce a sealed flexible package 32 in the radially inner layer.

Figure 3:
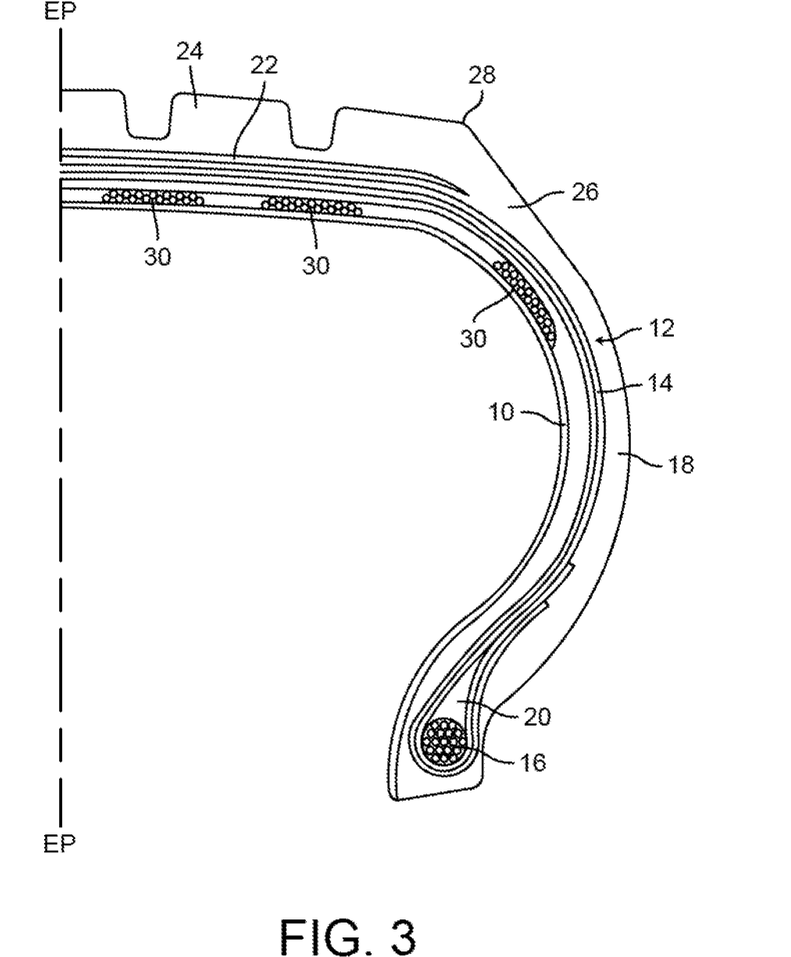
FIG. 3 illustrates another embodiment of a tire with a self-repair layer.

FIG. 1 illustrates the self-repair layer 30 extending continuously from the sidewall region to the tire equatorial plane E. The self-repair layer may be applied in discrete regions of the tire where the tire is most vulnerable, such as under the grooves and/or in the upper sidewall region, see FIG. 3.

The self-repair layer 30, may be formed at the time the tire is being built or pre-formed and applied to the tire building drum as a single layer, with appropriate modifications if the layer is formed non-continuously across the tire width. When formed at the time of tire building, the co-extruded sealed flexible packages 32 may be formed as a single continuous length of co-extruded tube with multiple cells. The tube is then spirally wound in a single layer and reverse spirally wound in such a manner to form multiple layers of offset packages 32. When the self-repair layer 30 is applied as a pre-formed layer, the packages can be extruded, e.g., as a wide sheet formed from an extruder fitted with a sufficient number of nozzles to form the desired width sheet and multiple cells in two dimensions.

Each method of forming has its advantageous. Spirally winding either on the tire building drum eliminates a splice from the self-repair layer 30. Spiral winding on the tire drum eliminates a step in manufacturing and the need to have a supply of fixed diameter sleeves of self-repair layers. Preforming as a sheet reduces build time at the tire building drum.

The inflatable article optionally includes an additional protecting material layer positioned near the sealed flexible package. The layer can be on one major surface (e.g., an exterior surface) of the package, on two major surfaces of the package, surrounding the package (e.g., enveloping the package), and combinations thereof. The layer can provide reinforcement to a repaired puncture in the article. In practice, the layer can be positioned such that when the article is punctured, the repair composition repairs the puncture and the additional layer adheres to the inflatable component through the repair composition thereby adding a reinforcing layer to the area near the repaired puncture.

The layer can be in a variety of forms including, e.g., a continuous sheet, a discontinuous sheet, a woven web and a nonwoven web. In some embodiments, the additional layer is a fiber weave that acts as a self-reinforcing mechanism that stops bullets upon a ballistic impact. The layer can be made from the elastomers, the thermoplastic polymers, and thermoset polymers set forth above. Woven and nonwoven webs are made from a variety of materials including, e.g., cotton, polyester, carbon, glass, polyolefin (e.g., polyolefin polymers (homopolymer, copolymers, and terpolymers) prepared from olefin monomers including, e.g., propylene, ethylene, butene, hexene, octene, and combinations thereof), polyvinyl acetate, butyl acrylate, ethylene vinyl acetate, polyamides (e.g., nylon), vinyl, p-phenylene terephthalamides, poly-metaphenylene isophthalamides, and combinations of any two or more thereof. The materials from which the webs can be made can be in a variety of forms including, e.g., fiber, yarns, thread, and combinations of any two or more thereof. Useful para-amide fibers include, e.g., p-phenylene terephthalamides, poly-metaphenylene isophthalamides, and combinations thereof.

Thus, in some embodiments, the inflatable article includes a ballistic grade woven web protecting the inflatable component, in whole or in part. For example, the ballistic grade woven web may surround the inflatable component. The ballistic grade woven web may include at least one of fiberglass, nylon fibers, polypropylene fibers, ultra-high molecular weight polyethylene fibers (UHMWPE; e.g., 2-6 million Daltons), metal fibers, inerga fibers, tegris fibers, para-amide fibers, meta-amide fibers, or polyparaphenylene terephthalamide fibers. For example, the ballistic grade woven web may include Dyneema (UHMWPE), Spectra (UHMWPE), Kevlar (poly-paraphenylene terephthalamide) or combinations thereof.

The sealed flexible package is relatively light weight and can be combined with other systems including, e.g., conventional run flat tire configurations, combined with polyurethane solid tires, combined with tires made from ballistic materials including fibers such as Kevlar or Dyneema, steel and stainless steel and combinations thereof.

The sealed flexible package also can be a component of a larger system, e.g., an inflation system such as a central tire inflation system (i.e., CTIS) are a self-inflation system, a pressurized gas component, a self-foaming system (e.g., systems in which polyurethane fills the tires with the aid of a CTIS system), a system that include a self-sealing layer of gel positioned on the inside of the tire or a layer of pliable rubber that is positioned on the inside of the tire that does not flow, and combinations thereof. With respect to a central tire inflation system, for example, the central tire inflation system can be in fluid communication with the inflatable, elastomeric article such that when a puncture occurs, activation of the central tire inflation system can perform a variety of functions including, e.g., transmitting gas (e.g., air) to the inflatable elastomeric article, facilitating delivery of the repair composition to the hole created by the puncture, and combinations thereof.

Other inflation systems can include a container that includes a pressure gas, e.g., a vapor pressure pump. When a puncture in the elastomeric article occurs, the pressurized gas is released and expands and forces the repair composition toward the hole.

The sealed flexible packages include two layers of a film-foil laminate sealed together at edges and lands 26 located within the flexible package 22 to form multiple sealed cells 24 that are sealed off from one another and that enclose the repair composition. The layers can be a single sheet (e.g., folded over upon itself and continuous tubing) or two separate layers.

In another embodiment, a series of woven webs of KEVLAR fibers are positioned between the sealed flexible package and the interior surface of a tire. The sealed package includes a number of seals positioned apart from one another, so as to partition the sealed package into segments that include at least one chamber in which a repair composition is disposed.

In other embodiments, the inflatable article includes a series of woven webs of KEVLAR fibers are positioned on the exterior surface of the sealed flexible package opposite the surface of the sealed package that is affixed to the interior surface of the tire.

In another embodiment, the inflatable article includes a sealed flexible package disposed between a solid support and the interior surface of a rubber tire of a run flat tire including along the interior surface of the side walls and the tread of the tire.

In another embodiment, the inflatable elastomeric article is in the form of a bike tire that includes a casing. The bead of the casing is attached to a wheel rim. The casing defines a volume in which an inner tube that is filled with air is positioned. The tire also includes a tire tread and a valve stem through which the inner tube is filled with pressurized air. Sealed flexible packages may be located within the casing or within the wall of the inner tube.

In other embodiments, the inflatable elastomeric article is in the form of a bladder that includes side walls that define a volume that is filled with fuel or some other gas, through a sealable opening, and a sealed flexible package is disposed within the side walls of the article.

In another aspect, the present technology provides a repair system that includes sealed flexible package in the form of hollow fibers (e.g., tubes) that are filled with a repair composition. The sealed flexible packages in the form of hollow fibers may be constructed as described herein. In some embodiments, the sealed flexible packages are formed in the shape of a tube with a metal foil disposed between two or more polymer films, e.g., a laminate. In some embodiments, the metal foil is an aluminum foil, although other metals and alloys disclosed herein may be used. In certain embodiments, the polymer films may be the same or different and may be selected from polyethylene, polypropylene, polyester and the like. The sealed flexible packages may also include an outer, elastomeric membrane such as rubber. The thickness of the walls of the fibers/tubes can be the same as described above. Similarly, the hollow fibers may optionally be divided into multiple sealed cells for greater control over repair composition release when the inflatable article is punctured.

In yet another aspect, the present technology provides a self-repairing article comprising: an inflatable component comprising one or more material layers wherein at least one material layer comprises an elastomer; a sealed flexible package disposed within or between material layers of the inflatable component, and a repair composition disposed in the sealed flexible package, wherein the sealed flexible package comprises: a first sheet with one or more edges; a second sheet with one or more edges; the repair composition is disposed between the first and second sheets; the first and second sheets are sealed to each other at the one or more edges, where each sheet is a laminate comprising a metal foil layer between two or more polymer layers that are the same or different; and the sealed flexible package is configured to release the repair composition upon puncture of the inflatable component. Embodiments of this article are contemplated incorporating any of the inflatable components and flexible packages or any combination of features as described herein. For example, in one non-limiting embodiment, the article is a tire, the inflatable component is a tire carcass, and the flexible package is disposed within the tire carcass or adjacent to the tire carcass.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:
1. A self-repairing article comprising:
   an inflatable component comprising one or more material layers wherein at least one material layer comprises an elastomer;
   a sealed flexible package disposed within or between material layers of the inflatable component, and
   a repair composition disposed in the sealed flexible package,
   wherein the sealed flexible package comprises:
   a first sheet with one or more edges;
   a second sheet with one or more edges;

the repair composition is disposed between the first and second sheets;

the first and second sheets are sealed to each other at the one or more edges, where each sheet is a laminate comprising a metal foil layer between two or more polymer layers that are the same or different; and the sealed flexible package is configured to release the repair composition upon puncture of the inflatable component.

2. The article of claim 1 comprising a plurality of sealed flexible packages.

3. The article of claim 2 wherein the sealed flexible packages are arranged in a layer conforming to the shape of the inflatable component.

4. The article of claim 2 wherein the sealed flexible packages are arranged in at least two layers conforming to the shape of the inflatable component.

5. The article of claim 4 wherein the layers of sealed flexible packages at least partially overlap.

6. The article of claim 1 wherein the flexible package comprises an elastomeric membrane as its outermost surface or is otherwise surrounded by an elastomeric membrane.

7. The article of claim 6 wherein the elastomeric membrane is a rubber membrane.

8. The article of claim 6 wherein the flexible package has a tube shape or a rectangular shape.

9. The article of claim 1 wherein each sheet is a laminate comprising a polymer layer and a metal foil layer or metalized polymer layer.

10. The article of claim 1 wherein the metal is aluminum, tin, steel or an alloy of anyone of the foregoing.

11. The article of claim 1 wherein the laminate comprises the metal foil layer between two or three polymer layers.

12. The article of claim 1 wherein an interior surface of the sealed flexible package is an acid-treated surface.

13. The article of claim 12, wherein the acid-treated surface has been treated with at least one of muriatic acid, maleic acid, or acetic acid.

14. The article of claim 1, wherein the polymer is selected from the group consisting of nylon, polyolefin, polyester, polycarbonate, polyacrylate, polyarylate, polyamide, polyimide, polyaramide, polyurethane, cellulose, and nitrocellulose.

15. The article of claim 1, wherein the polymer is selected from the group consisting of polyester, polyethylene and polypropylene.

16. The article of claim 1 wherein the repair composition comprises one or more of cyanoacrylate, one-part epoxy, polymerizable monomers, polymerizable oligomers, polyurethane, rubber cement, and cold vulcanizing fluid with or without natural rubber whiskers.

17. The article of claim 16, wherein the repair composition comprises one or more of an acrylate, alkyl acrylate, methylmethacrylate, cyanoacrylate, acrylic acid, alkyl acrylic acid, olefin, lactone, lactam, styrene, isoprene, butadiene, urethane, dicyclopentadiene and epoxy.

18. The article of claim 1 wherein the repair composition comprises one or more of ethyl 2-cyanoacrylate, methyl 2-cyanoacrylate, n-butyl cyanoacrylate, 2-octyl cyanoacrylate, alkyl (meth)acrylate, rubber cement, and a mixture of cold vulcanizing fluid and rubber pieces.

19. The article of claim 1 wherein the repair composition comprises cold vulcanizing fluid and rubber whiskers.

20. The article of claim 1 wherein the repair composition comprises a chemical capable of chemically bonding to an elastomeric polymer.

21. The article of claim 1 wherein the elastomeric material is selected from the group consisting of natural rubber and synthetic rubber.

22. The article of claim 21, wherein the article is a pneumatic tire.

23. The article of claim 22, wherein the pneumatic tire is a car tire, truck tire, garbage truck tire, motorcycle tire, trailer tire, military vehicle tire or ATV tire.

24. A wheel comprising the tire of claim 22.

25. The article of claim 1, wherein the inflatable component has the shape of a tube, beam or arch.

26. The article of claim 25, wherein the article comprises a ballistic grade woven web protecting the inflatable component.

27. The article of claim 26, wherein the ballistic grade woven web comprises at least one of fiberglass, nylon fibers, polypropylene fibers, metal fibers, inerga fibers, tegris fibers, para-amide fibers meta-amide fibers, or polyparaphenylene terephthalamide fibers.

28. The article of claim 26, wherein the ballistic grade woven web surrounds the inflatable component.

29. A structure comprising an article of claim 25, wherein the article supports the structure in part or in full.

30. The structure of claim 26 wherein the structure is a tent or building.

* * * * *